US008222180B2

(12) United States Patent
Kumar et al.

(10) Patent No.: US 8,222,180 B2
(45) Date of Patent: Jul. 17, 2012

(54) ADSORBENT COMPOSITION FOR REMOVAL OF REFRACTORY SULPHUR COMPOUNDS FROM REFINERY STREAMS AND PROCESS THEREOF

(75) Inventors: Sarvesh Kumar, Haryana (IN); Alex C. Pulikottil, Haryana (IN); Alok Sharma, Haryana (IN); Ujjwal Manna, Haryana (IN); Manoranjan Santra, Haryana (IN); Ram P. Verma, Haryana (IN)

(73) Assignee: Indian Oil Corporation Limited, Faridabad (IN)

( * ) Notice: Subject to any disclaimer, the term of this patent is extended or adjusted under 35 U.S.C. 154(b) by 1133 days.

(21) Appl. No.: 11/352,955

(22) Filed: Feb. 13, 2006

(65) Prior Publication Data

US 2007/0023325 A1 Feb. 1, 2007

(30) Foreign Application Priority Data

Aug. 1, 2005 (IN) .......................... 2046/DEL/2005

(51) Int. Cl.
  *B01J 20/06* (2006.01)
  *B01J 20/08* (2006.01)
  *B01J 20/12* (2006.01)
  *B01J 20/30* (2006.01)

(52) U.S. Cl. ..................... 502/406; 502/400; 502/415

(58) Field of Classification Search ........... 502/400–438
  See application file for complete search history.

(56) References Cited

U.S. PATENT DOCUMENTS

| | | | |
|---|---|---|---|
| 2,527,889 A | 10/1950 | Fischer et al. | |
| 2,962,442 A | 11/1960 | Andress | |
| 3,036,003 A | 5/1962 | Verdol | |
| 3,269,810 A | 8/1966 | Chamot | |
| 3,324,032 A | 6/1967 | O'Halloran | |
| RE26,330 E | 1/1968 | Colfer | |
| 3,368,972 A | 2/1968 | Otto | |
| 3,539,633 A | 11/1970 | Piasek et al. | |
| 3,649,229 A | 3/1972 | Otto | |
| 3,943,064 A * | 3/1976 | Ballain et al. ................. | 502/439 |
| 4,038,044 A | 7/1977 | Garth | |
| 4,171,285 A * | 10/1979 | Mulaskey ..................... | 502/400 |
| 4,174,272 A | 11/1979 | Schwartz | |
| 4,263,020 A * | 4/1981 | Eberly, Jr. ..................... | 502/524 |
| 4,419,273 A * | 12/1983 | Santilli et al. .................. | 502/84 |
| 4,458,023 A | 7/1984 | Welsh et al. | |
| 4,690,806 A * | 9/1987 | Schorfheide .................. | 423/230 |
| 5,137,980 A | 8/1992 | DeGonia et al. | |
| 5,166,120 A * | 11/1992 | Deller et al. .................. | 502/345 |
| 5,288,739 A | 2/1994 | Demmel | |
| 5,316,992 A * | 5/1994 | Russ et al. ..................... | 502/74 |
| 5,516,444 A | 5/1996 | Gaines et al. | |
| 5,697,988 A | 12/1997 | Malfer et al. | |
| 5,756,435 A | 5/1998 | Carey et al. | |
| 5,873,917 A | 2/1999 | Daly | |
| 5,876,468 A | 3/1999 | Moreton et al. | |
| 6,056,871 A | 5/2000 | Khare et al. | |
| 6,179,885 B1 | 1/2001 | McAtee et al. | |
| 6,184,176 B1 | 2/2001 | Khare | |
| 6,254,766 B1 | 7/2001 | Sughrue et al. | |
| 6,271,173 B1 | 8/2001 | Khare | |
| 6,274,031 B1 | 8/2001 | Khare et al. | |
| 6,274,533 B1 | 8/2001 | Khare | |
| 6,277,158 B1 | 8/2001 | McLean et al. | |
| 6,338,794 B1 * | 1/2002 | Khare ........................... | 208/247 |
| 6,346,190 B1 | 2/2002 | Khare | |
| 6,428,685 B2 | 8/2002 | Khare | |
| 6,429,170 B1 | 8/2002 | Dodwell | |
| 6,458,172 B1 | 10/2002 | Macduff et al. | |
| 6,482,314 B1 | 11/2002 | Khare | |
| 6,656,877 B2 * | 12/2003 | Sughrue et al. ............... | 502/407 |
| 6,660,696 B1 | 12/2003 | Ranjan et al. | |
| 6,683,024 B1 | 1/2004 | Khare et al. | |
| 6,797,021 B2 | 9/2004 | Puri et al. | |
| 6,797,038 B2 * | 9/2004 | Choudary et al. ............ | 502/407 |
| 6,803,343 B2 | 10/2004 | Khare | |
| 6,858,556 B2 | 2/2005 | Kuvettu et al. | |
| 6,930,067 B2 | 8/2005 | O'Connor et al. | |
| 2003/0003255 A1 | 1/2003 | Stover | |

(Continued)

FOREIGN PATENT DOCUMENTS

CA 2089833 8/1993

OTHER PUBLICATIONS

C.E. Marshall and O.G. Caldwell, The Colloid Chemistry of the Clay Mineral Attapulgite, 51 J. Phys. Chem. 311-320 (1947).*
U.S. NonFinal Office Action dated Jun. 26, 2007 under U.S. Appl. No. 11/506,405, 9 pages.
U.S. NonFinal Office Action dated Feb. 20, 2008 under U.S. Appl. No. 11/506,405, 10 pages.
U.S. NonFinal Office Action dated Jun. 26, 2008 under U.S. Appl. No. 11/244,863. 12 pages.
U.S. NonFinal Office Action dated Aug. 19, 2008 under U.S. Appl. No. 11/244,883, 12 pages.

(Continued)

*Primary Examiner* — Randy Boyer (74) *Attorney, Agent, or Firm* — Perkins Coie LLP (57) ABSTRACT

The present invention relates to a adsorbent composition for removing refractory sulphur compounds from refinery streams comprising of base component in the range of 10 to 50 wt %, spinel oxide in the range of 20 to 60 wt % as a reactive metal oxide component and bimetallic alloy in the range of 10 to 40 wt % acting as an adsorption enhancer component, wherein the adsorption enhancer component acts in synergy with base component. The invention also relates to a process for the preparation of said composition by mixing in solid state fine particles of base component, spinel oxide and bimetallic alloy, homogenizing the mixture thus obtained with solvent, peptizing the wet solid with dilute mineral acid, extruding the peptized material with extrusion aiding agents, drying the extrudates, further calcining the dried extrudates and reducing the calcined material under hydrogen flow.

11 Claims, 9 Drawing Sheets

U.S. PATENT DOCUMENTS

| | | |
|---|---|---|
| 2003/0046861 A1 | 3/2003 | Ohta et al. |
| 2003/0140552 A1 | 7/2003 | Schwahn et al. |
| 2003/0163948 A1 | 9/2003 | Van Leest et al. |
| 2004/0007506 A1 | 1/2004 | Song et al. |
| 2004/0063576 A1 | 4/2004 | Weston et al. |
| 2005/0192185 A1 | 9/2005 | Saathoff et al. |
| 2006/0277819 A1 | 12/2006 | Puri et al. |
| 2006/0277820 A1 | 12/2006 | Puri et al. |

OTHER PUBLICATIONS

Avidan et al., National Petroleum and Refiner Association, Annual Meeting. Washington, D.C. Mar. 2001, Paper AM-01-55.

Hernandez-Maldonado et al. "Desulfurization of Transportation Fuels by Adsorption," Catalysis Reviews, vol. 46, No. 2m pp. 111-150, 2004.

Ma et al. "Hydrodesulfurization reactivities of various sulfur compounds in diesel fuel," Ind. Eng., Chem. Res. 1994, 33, 218-222.

Ma et al., "Hydrodesulfurization reactivities of various sulfur compounds in vacuum gas oil," Ind. Eng., Chem. Res. 1996, 35, 2487-2494.

Parkinson et al. "Diesel desulfurization puts refiners in a quandary," Chem Eng., 108 (2), (2001) 37-41.

Song et al., "A new approach to deep desulfurization of gasoline, diesel fuel, and jet fuel by selective adsorption for ultra-clean fuels and for fuel cell applications," Catalysis Today 77, 2002, 107-116.

Whitehurst et al. "Present State of the art and future challenges in the hydrodesulfurization of polyaromatic sulfur compounds," Adv. Catal., 42 (1998), 345-471.

\* cited by examiner

ADSORBENT COMPOSITION FOR REMOVAL OF REFRACTORY SULPHUR COMPOUNDS FROM REFINERY STREAMS AND PROCESS THEREOF

CROSS-REFERENCE TO RELATED APPLICATION(S)

This application claims priority to Indian Patent Application no 2046/DEL/2006 filed on Aug. 1, 2005, the disclosure of which is incorporated herein in its entirety by reference.

TECHNICAL FIELD

The present invention relates to an adsorbent composition(s) comprising of base component, reactive metal oxide component and an adsorption enhancer component in synergy with base component for removal of refractory sulfur compounds from refinery streams. The invention also relates to a process for the preparation of said adsorbent composition(s).

BACKGROUND

U.S. Patent Publication No. 2004/0007506 have made efforts to design the several adsorbents to physically adsorb the sulfur compounds selectively from the various hydrocarbon fuels e.g. gasoline, kerosene, jet fuel and diesel fuel etc. These adsorbents showed the selectivity for other compounds e.g. aromatics and olefins etc. also and saturated at very low treated volume of the fuels. In the regeneration process, the adsorbed compounds were removed by solvent washing. The sulfur compounds were then recovered in concentrated forms by evaporation of the solvent. This concentrated sulfur containing stream was then treated in a small hydrotreater reactor and blended to the adsorbent treated product. The treating of this concentrated sulfur-containing stream will require severe operating conditions and higher consumption of hydrogen. This process may not be economically viable due to low selectivity, faster saturation, treating of concentrated sulfur containing streams and low recovery of the fuel streams.

U.S. Patent Publication No US2003/03255A1 discloses an adsorbent prepared by the conventional impregnation of a sorbent support comprising zinc oxide, expanded perlite, and alumina with a promoter metal such as nickel, cobalt.

U.S. Patent Publication No US2004/0063576A1 discloses a catalyst adsorbent comprised of nickel compound deposited on a silica carrier by using conventional precipitation process. Alumina and alkaline earth compounds are used as promoters U.S. Pat. No. 6,803,343 discloses a sorbent composition comprising, a support system prepared by admixing zinc oxide with silica/alumina, and incorporating the support with reduced valence noble metal.

U.S. Pat. No. 6,683,024 discloses a sorbent composition, which contains a support component and a promoter component with the promoter component being present as a skin of the support. The above sorbent is prepared by a process of impregnating a support component with a promoter.

U.S. Pat. No. 6,656,877 discloses an attrition resistant sorbent, prepared by the impregnation of a sorbent support comprising zinc oxide, expanded perlite, and alumina with a promoter such as nickel, nickel oxide or a precursor of nickel oxide followed by reduction of the valence of the promoter.

U.S. Pat. No. 6,482,314 discloses particulate sorbent compositions comprising a mixture of zinc oxide, silica, alumina and substantially reduced valence cobalt, prepared by impregnation method, for the desulfurization of a feed stream of cracked-gasoline or diesel fuels U.S. Pat. No. 6,429,170 discloses attrition resistant, sorbent compositions for the removal of elemental sulfur and sulfur compounds, such as hydrogen sulfide and organic sulfides, from cracked-gasoline and diesel fuels are prepared by the impregnation of a sorbent support comprising zinc oxide, expanded perlite, and alumina with a promoter such as nickel, nickel oxide or a precursor of nickel oxide followed by reduction of the valence of the promoter metal in the resulting promoter metal sorbent support composition.

U.S. Pat. No. 6,428,685 discloses a particulate sorbent compositions which are suitable for the removal of sulfur from streams of cracked-gasoline or diesel fuel are provided which have increased porosity, improved resistance to deactivation through the addition of a calcium compound selected from the group consisting of calcium sulfate, calcium silicate, calcium phosphate or calcium aluminate to the support system comprised of zinc oxide, silica and alumina having thereon a promoter wherein the promoter is metal, metal oxide or metal oxide precursor.

U.S. Pat. No. 6,346,190 discloses a particulate sorbent compositions consisting essentially of zinc ferrite, nickel and an inorganic binder, wherein the zinc ferrite and nickel of reduced valence, are provided for the desulfurization of a feed stream of cracked-gasoline or diesel.

U.S. Pat. No. 6,338,794 discloses a particulate sorbent compositions comprising zinc titanate support having thereon a substantially reduced valence promoter metal selected from the group consisting of cobalt, nickel, iron, manganese, copper, molybdenum, tungsten, silver, tin and vanadium or mixtures thereof provide a system for the desulfurization of a feed stream of cracked-gasolines or diesel fuels.

U.S. Pat. No. 6,274,533 discloses a sorbent system prepared by impregnating a particulate support which comprises zinc oxide and an inorganic or organic carrier with a bimetallic promoter formed from two or more metals selected from the group consisting of nickel, cobalt, iron, manganese, copper, zinc molybdenum, tungsten, silver, and tin.

U.S. Pat. No. 6,274,031 discloses a novel circulatable sorbent material suitable for use in a transport desulfurization system for removing sulfur from a fluid stream containing sulfur and the use thereof in such a transport desulfurization system. The transport desulfurization process utilizes a circulatable particulate material containing alumina, silica, zinc oxide and a metal oxide, which is contacted with a fluid stream and thereafter separated and reused with a portion being regenerated.

U.S. Pat. No. 6,271,173 discloses a particulate sorbent compositions which are suitable for the removal of sulfur from streams of cracked-gasoline or diesel fuel are provided which have increased porosity, improved resistance to deactivation through the addition of a calcium compound selected from the group consisting of calcium sulfate, calcium silicate, calcium phosphate or calcium aluminate to the support system comprised of zinc oxide, silica and alumina having thereon a promoter wherein the promoter is metal, metal oxide or metal oxide precursor with the metal being selected from the group consisting of cobalt, nickel, iron, manganese, copper, molybdenum, tungsten, silver, tin and vanadium or mixtures thereof and wherein the valence of such promoter has been substantially reduced to 2 or less. Process for the preparation of such sorbent systems as well as the use of same for the desulfurization of cracked-gasolines and diesel fuels are also provided.

U.S. Pat. No. 6,254,766 discloses a particulate sorbent compositions comprising a mixture of zinc oxide, silica, alumina and a substantially reduced valence nickel are provided for the desulfurization of a feed stream of cracked-gasoline or diesel fuels in a desulfurization zone by a process which comprises the contacting of such feed streams in a desulfurization zone followed by separation of the resulting low sulfur-containing stream and sulfurized-sorbent and thereafter regenerating and activating the separated sorbent before recycle of same to the desulfurization zone.

U.S. Pat. No. 6,184,176 discloses a sorbent comprising a mixture of zinc oxide, silica, alumina and substantially reduced valence cobalt provided for the desulfurization of a feed stream of cracked-gasoline or diesel fuels.

U.S. Pat. No. 6,056,871 discloses a novel circulatable sorbent material suitable for use in a transport desulfurization system for removing sulfur from a fluid stream containing sulfur and the use thereof in such a transport desulfurization system. The transport desulfurization process utilizes a circulatable particulate material containing alumina, silica zinc oxide and a metal oxide, which is contacted with a fluid stream and thereafter separated and reused with a portion being regenerated.

The adsorbents reported in the prior art as above involves, the conventional impregnation approaches for loading the active metal components.

The surprising results of the present invention is by achieving enhanced adsorption capacity for the adsorbent composition used for removing most refractory sulfur compounds from refinery streams in a short duration of time and also consuming minimum quantity of hydrogen in the complete process.

DETAILED DESCRIPTION

The present invention generally relates to an adsorbent composition for removing refractory sulphur compounds from refinery streams, the said composition comprising of base component in the range of 10 to 50 wt %, Spinel oxide in the range of 20 to 60 wt % as reactive metal oxide component, bimetallic alloy in the range of 10 to 40 wt % acting as an adsorbent enhancer component in synergy with base component of the said composition. The invention also relates to a process for the preparation of said composition by mixing in solid state fine particles of said components of said composition, homogenizing the mixture thus obtained, peptizing the homogenized solid, extruding the peptized material, drying the extrudates, further calcining the dried extrudates and reducing the calcined material under hydrogen flow.

In one embodiment, the present invention provides a reactive adsorbent composition for removal of refractory sulphur compounds from refinery streams comprising of:

| Ingredient | w/w (%) |
|---|---|
| Base component | 10.0 to 50.0 |
| Spinel oxide | 20.0 to 60.0 |
| Bimetallic alloy | 120.0 to 40.0 |

The base component of composition is a porous material selected from a group consisting of alumina, clay, magnesia, titania or mixtures thereof. In one embodiment, the base component clay comprises mainly of titanium oxide, ferric oxide, manganese dioxide and silicon dioxide. The bimetallic alloy acts as an adsorption capacity-enhancer component in synergy with base component of the adsorbent composition.

In one embodiment, a reactive adsorbent composition includes surface area ranging from about 50 to about 200 $m^2/gm$. In another embodiment, a reactive adsorbent composition includes a pore volume ranging from about 0.1 to about 0.6 cc/gm. In another embodiment, a reactive adsorbent composition includes an average pore size ranging from about 50 to about 200A°.

The reactive metal oxide component can be a spinel oxide of a formula $AB_2O_4$ where A represents a divalent metal such as zinc, nickel, magnesium and like metals, and B represents a trivalent metal such as aluminium, chromium, gallium, iron and like metals.

The adsorption enhancer component can include a bimetallic alloy of metals such as nickel, platinum, palladium, titanium, zinc, and other suitable metals. For example, the bimetallic alloy can be alloy Nickel zinc oxide, Platinum zinc oxide, Palladium zinc oxide, Titanium zinc oxide or mixtures thereof.

The refinery stream can be heavy end gas oil, gasoline, kerosene, jet fuel and/or diesel fuel.

In another embodiment, present invention provides a process for the preparation of an adsorbent composition for removal of refractory sulphur compounds from a refinery stream includes mixing a base component, a reactive metal oxide component and a adsorption enhancer component and grinding the mixture to fine particles. The particles are then homogenized by milling with a solvent to form a wet solid. The homogenized particles are then peptized with dilute mineral acid and extruded. The particles are dried at a temperature of about 100 to about 200° C. for about 4 to about 12 hours. The dried material is calcined at a temperature ranging from about 200 to about 550° C. for a period of about 4 to about 12 hours. The calcined material is then reduced under a hydrogen flow at a temperature ranging between about 250 to about 500° C. to obtain a dried adsorbent composition.

The solvent used in the process can be water, acetone, propanol and acetone. The mineral acid used in the process can be dilute nitric acid.

In another embodiment, the above process can further include applying an extrusion-aiding agent, such as polyvinyl alcohols, polyethylene glycols, and carboxymethyl cellulose.

In a further embodiment, present invention provides a process for removal of refractory sulphur compounds from various refinery streams comprising passing the refinery stream through the reactor maintained at appropriate flow rate, pressure, liquid hourly space velocity, hydrogen flow, and temperature, wherein the reactor is loaded with adsorbent composition and obtaining treated refinery stream.

The process involves the pressure ranges from about 5 to about 30 bar, preferably between 10 to 20 bar. The ratio of hydrogen to refinery stream ranges from about 100 to about 600 v/v, preferably 200 to 400 v/v. The process utilizes a temperature ranging between about 150 to about 500° C. The liquid hourly space velocity ranges from 0.5/h to 5.0/h and preferably from to 1.0/h to 2.0/h. The refinery stream used has a boiling point ranging between 35-450° C. and sulphur content ranging from about 300-3000 ppm.

In one aspect, high adsorption capacity adsorbent having high surface area and porosity is produced by solid-state reaction. The adsorbent is designed to remove the most refractory sulfur compounds even from high final boiling point (FBP) up to about 450° C. The adsorbent comprised of a base component, a reactive mixed metal oxide component, and an adsorption capacity-enhancer component.

The base component of the adsorbent is a porous material, which provides the porosity, elasticity for extrusion and strength to the said adsorbent. The materials used can be alumina, clay, magnesia, titania or a mixture of two or more of the said base materials, or a clay in the range from about 5 to 35 weight percent and an alumina in the range from about 5 to 20 weight percent. The base component can be a porous gamma alumina having surface area in the range from about 250 to 350 m²/g and having a unimodal pore size distribution. The clay component contains mainly $TiO_2$, $Fe_2O_3$, $MnO_2$, and $SiO_2$ can be obtained from the state of Rajasthan in India. The base clay component also acts as an adsorption enhancer in synergy with the other active components. The base component will generally be present in range from about 10 to 50 weight percent.

The reactive component of adsorbent is a spinel oxide of the form $AB_2O_4$ where 'A' is a divalent atom like Zn, Ni, Mg, Mn. Fe and 'B' a trivalent metal atom like Al etc. The reactive component of the adsorbent can be prepared through solid-state reactions of the said metal oxides at the temperature range from about 400 to 650° C. The reactive metal oxide component will generally be present in range from about 20 to 60 weight percent. This component is responsible for detaching the sulfur molecule form the sulfur compound. The reactive metal oxide component will generally be present in range from about 20 to 60 weight percent.

The activity enhancer component of the adsorbent is a bimetallic alloy generated in situ from a mixed metal oxide such as oxides of nickel, platinum, palladium etc and zinc, acts as an adsorption enhancer in synergy with the clay component. The adsorption capacity enhancer metal oxide component will generally be present in range from about 10 to 40 weight percent.

All three components of the adsorbent were mixed in a crucible in dry solid form. The mixture can then be grinded in a grinder to generate a powder of fine particles and homogenized by mulling with solvent such as water, acetone and propanol. The wet solid was then used in an extruder after peptizing with dilute acids preferably with nitric acid and/or by the addition of extrusion aiding agents like polyvinyl alcohols, polyethylene glycols or carboxymethyl cellulose. The extrudates of the adsorbents can then be dried at room temperature overnight followed by drying in a furnace at about 100-200° C. temperature for about 4 to 12 hrs. The dried adsorbent was then calcined in a furnace at about 200- about 550° C. temperature for about 4 to 12 hrs. An optimum temperature and multiple calcinations steps are required to ensure that the active phase is increased.

The final adsorbents has a surface area ranging from about 50 to about 200 m²/gm, pore volume ranging from about 0.1 to about 0.6 cc/gm and average pore size ranging from about 50-200A°. The final adsorbent can then be reduced in a temperature range from about 250-500° C. under hydrogen flow.

After reduction, the adsorbent can be used for reducing sulfur content in hydrocarbon fuels such as naphtha, gasoline, jet fuel, and kerosene and diesel fractions. The adsorption process occurs in one or more numbers of fixed bed reactors. The adsorption process was carried out in the temperature range of about 150-500° C., pressure range of about 5 to 30 bar, hydrogen to hydrocarbon ratio in a range of about 100 to 600 v/v, liquid hourly space velocity in the range of 0.5 to 5/h.

After reaching the optimum level, the adsorbents were regenerated in the temperature range of about 200-500° C. in a mixture of air and nitrogen.

The two numbers of adsorbents (A-1 and A-2) have been prepared by adding various constituents in different ratios. The details of these adsorbents are reported in Table 1c.

Feed Diesel

The diesel feed stocks used in treating of these feeds have been generated by hydrotreating the high sulfur containing feed (1.0 to 1.5 wt %). The feed contains higher boiling range materials up to about 450° C. The feed contains higher concentration of most refractory sulfur compounds such as 4 or 6-MDBT; 4,6-DMDBT, and other alkyl DBTs due to higher boiling range material in the feed stream. The details of the diesel feed stocks are reported in Table-1a/1b.

TABLE 1a

Properties of Feed Diesel

|  | Feed 1 | Feed 2 | Feed 3 | Feed 4 | Feed 5 |
| --- | --- | --- | --- | --- | --- |
| 1. Total 'S' (ppm) | 500 | 400 | 350 | 260 | 65 |

2. SIMTBP

| Weight % | Temperature in ° C. | | | | |
| --- | --- | --- | --- | --- | --- |
| IBP | 114 | 130 | 113 | 115 | 128 |
| 5 | 158 | 190 | 170 | 174 | 183 |
| 10 | 194 | 218 | 197 | 206 | 208 |
| 30 | 253 | 264 | 255 | 260 | 259 |
| 50 | 287 | 295 | 288 | 292 | 291 |
| 70 | 321 | 323 | 321 | 325 | 323 |
| 90 | 366 | 367 | 365 | 369 | 367 |
| 95 | 385 | 388 | 381 | 390 | 385 |
| FBP | 451 | 450 | 421 | 432 | 429 |

3. Component Analysis

| Component | Weight % | |
| --- | --- | --- |
| Saturates | 71.8 | 69.7 |
| Mono-Aromatics | 25.6 | 27.2 |
| Di-Aromatics | 2.4 | 2.9 |
| Poly-Aromatics | 0.2 | 0.2 |

TABLE 1b

GC-SCD of Diesel Feed-3 (Total 'S' = 350 ppm)

| Peak No. | Comp | RT Min | Area | Area % | Total 'S' PPM |
|---|---|---|---|---|---|
| 1 | C6BT-4 | 38.73 | 16954 | 1.01 | 4 |
| 2 | C7BT-1 | 41.15 | 26340 | 1.57 | 5 |
| 3 | 4-MDBT | 41.68 | 128275 | 7.65 | 27 |
| 4 | MDBT-1 | 42.19 | 23401 | 1.40 | 5 |
| 5 | MDBT-2 | 42.55 | 27007 | 1.61 | 6 |
| 6 | C7BT-2 | 42.85 | 38592 | 2.30 | 8 |
| 7 | C2DBT-1 | 44.13 | 36114 | 2.15 | 8 |
| 8 | 4,6-DMDBT | 44.44 | 166799 | 9.95 | 35 |
| 9 | C2DBT-2 | 44.99 | 151659 | 9.04 | 32 |
| 10 | C2DBT-3 | 45.66 | 114337 | 6.82 | 24 |
| 11 | C2DBT-4 | 46.05 | 82671 | 4.93 | 17 |
| 12 | C2DBT-5 | 46.44 | 12004 | 0.72 | 3 |
| 13 | C2DBT-6 | 46.67 | 79637 | 4.75 | 17 |
| 14 | C3DBT-1 | 47.37 | 116555 | 6.95 | 24 |
| 15 | C3DBT-2 | 47.90 | 58916 | 3.51 | 12 |
| 16 | C3DBT-3 | 48.27 | 75838 | 4.52 | 16 |
| 17 | C3DBT-4 | 48.67 | 125139 | 7.46 | 26 |
| 18 | C3DBT-5 | 49.08 | 33802 | 2.02 | 7 |
| 19 | C3DBT-6 | 49.26 | 16254 | 0.97 | 3 |
| 20 | C3DBT-7 | 49.52 | 44477 | 2.65 | 9 |
| 21 | C4DBT-1 | 49.78 | 33378 | 1.99 | 7 |
| 22 | C4DBT-2 | 50.27 | 52534 | 3.13 | 11 |
| 23 | C4DBT-3 | 50.67 | 46401 | 2.77 | 10 |
| 24 | C4DBT-4 | 51.20 | 76056 | 4.54 | 16 |
| 25 | C4DBT-5 | 51.90 | 13287 | 0.79 | 3 |
| 26 | C4DBT$^d$ | 52.17 | 41351 | 2.47 | 9 |
| 27 | C5DBT-1 | 52.52 | 23516 | 1.40 | 5 |
| 28 | C5DBT-2 | 52.83 | 15589 | 0.93 | 3 |
|  |  |  | 1676881 | 100 | 350 |

Experimental Setup

Figure 1:
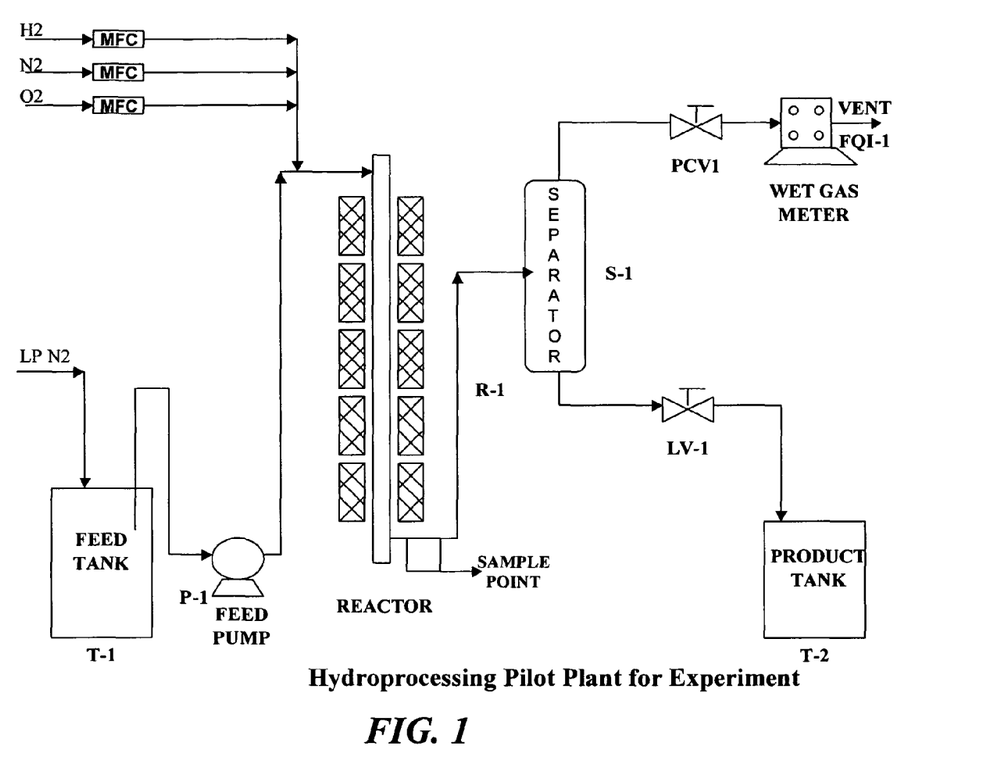
FIG. 1 is a diagrammatic representation of hydroprocessing pilot plant for experiment.

Experiments are carried out in a hydro processing pilot plant. The details of the pilot plant are shown in FIG. 1. This pilot plant contains two numbers of fixed bed reactors, which can be operated one at a time or both in series. These reactors are equipped with separate electrical furnaces, which can heat the reactors up to 600° C. The furnace is divided into five different zones. The top zone is for preheating the feed stream before entering the process zones. The middle three zones are for process reactions and bottom zone is used for post heating purposes. Adjusting the corresponding skin temperatures controls the reactor internal temperatures.

The feed is charged into a feed tank (T-1), which can preheat the feedstock up to about 150° C. The feed was then pumped through a diaphragm pump (P-1). Three Mass Flow Controllers each for measurement of hydrogen, nitrogen and air are equipped in the inlet of the reactors. In the adsorption step, the liquid and gas streams join and enter into the reactors in down flow mode. The isothermal temperature profile is maintained throughout the adsorption zone. The reactor effluent stream then enters to Separator (S-1), where gas and liquid streams are separated. The gas stream exit from the top of the separator and sent to vent via a pressure control valve (PV-1) and wet gas meter (FQI-1). The liquid stream exit from the bottom of the separator and collected in product tank (T-2) through a level control valve (LV-1)). The hydrocarbon feed and reactor effluent samples are analyzed for total sulfur content by Sulphur-Nitrogen Analyzer (Antek) and sulphur compound class by GC-SCD.

Regeneration of the Adsorbents

The regeneration of adsorbents was completed in three steps. In the first step, adsorbed hydrocarbons were stripped with nitrogen. In the second step, the adsorbed sulphur on the adsorbent was burnt with nitrogen and air mixture followed by post stripping with nitrogen to replace the residual of air. In the third step, the adsorbent was activated by hydrogen at 400° C. for about 1 to 2 hrs. After regeneration, the adsorbent was ready for reuse.

The study is further explained with examples of treating various diesel feedstocks of different sulfur contents ranging from 65 to 500 ppm. The experiments are performed at different operating conditions e.g. temperatures ranging from ambient to 400° C., pressure ranging from 10 to 20 bar, hydrogen to hydrocarbon ratio flow ranging from 10 to 50, and LHSV ranging from 0.5 to 2.0 per hour.

EXAMPLES

Example 1

Preparation of Reactive Adsorbent Composition(s)

1. Two reactive adsorbent composition(s) (A-1 & A-2) were prepared by solid-sate mixing of zinc nickel aluminate, zinc nickel oxide, Rajasthan clay and alumina in different proportions.
2. Zinc nickel aluminate was prepared through the solid-state reaction of zinc oxide, nickel oxide and alumina at a temperature of about 550-600° C.
3. The zinc nickel oxide was prepared through the solid-state reaction of zinc oxide, and nickel oxide at a temperature of about 500-600° C.
4. The nickel oxide used in above steps 2 and 3 was obtained from nickel nitrate hexahydrate
5. The various components prepared above were mixed in the desired proportions in a crucible and ground intermittently using acetone for homogenization of the solid and dried.
6. The dried powder was extruded after peptizing with about 1% nitric acid to form the cylindrical pellets. The pellets were then dried at a room temperature of about 30° C. overnight followed by drying at a temperature of about 120° C. for about 4-12 hours.
7. The dried adsorbent is then calcined at a temperature of about 600° C. for about 4-12 hours
8. Two reactive adsorbent compositions A-1 and A-2 were prepared as per above prescribed method. The details of composition and characteristic properties of reactive Adsorbents are listed in Table 1c.

TABLE 1c

Composition and Characterization of Adsorbents

| | Weight Percent | |
|---|---|---|
| | Adsorbent (A-1) | Adsorbent A-2 |
| 1. Component | | |
| Zinc Nickel Aluminate | 50 | 45 |
| Zinc Nickel Oxide | 40 | 25 |
| Rajasthan Clay | 10 | 15 |
| Alumina | — | 15 |
| 2. BET Surface Area (m$^2$/gm) | 57 | 106 |
| 3. Pore Volume (cc/gm) | 0.14 | 0.22 |
| 4. Avg. Pore Size (A°) | 100 | 83 |

Example 2

Treatment of Diesel Feed-1 with Alumina

Figure 2:
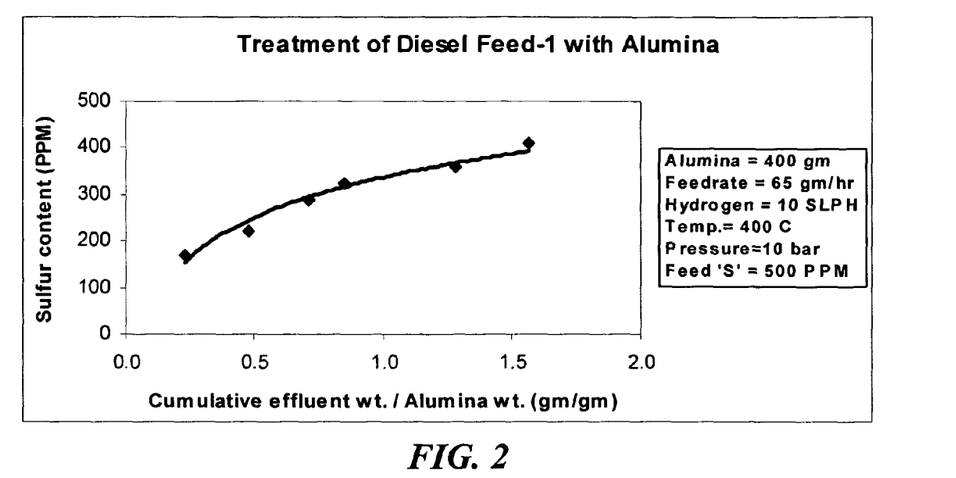
FIG. 2 is a graphical representation of treatment of Diesel feed-1 with Alumina.

In this experiment, commercially available alumina (400 gms) of balls size ranging from 3 to 5 mm diameter were loaded in a fixed bed reactor that has an internal diameter of 25 mm and length of 1100 mm. Activation was performed by hydrogen at 400° C. for about one hour. Diesel Feed-1 containing 500 ppm sulfur was passed through the reactor at the rate of 65 gm/hr in down flow mode. The reactor pressure of 10 bar and hydrogen flow of 10 SLPH was maintained during the experiment. The treated reactor effluent samples were collected at regular intervals and analyzed for sulfur content by Sulfur-Nitrogen Analyzer. The results obtained are shown in Table 2 and FIG. 2.

TABLE 2

Desulfurization of Diesel Feed-1 with Alumina

| Cum. effluent wt. (gm) | Cum. effluent wt./ Alumina wt. (gm/gm) | Sulfur Content (ppm) |
| --- | --- | --- |
| 93 | 0.2 | 171 |
| 190 | 0.5 | 220 |
| 283 | 0.7 | 288 |
| 339 | 0.8 | 321 |
| 513 | 1.3 | 357 |
| 625 | 1.6 | 410 |

Example 3

Treatment of Diesel Feed-1 with Fresh Adsorbent A-1

Figure 3:
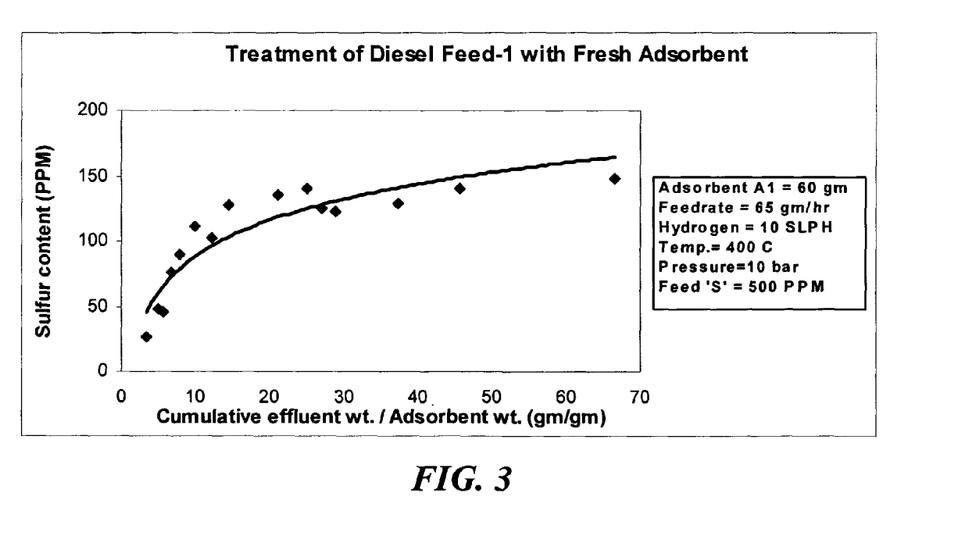
FIG. 3 is a graphical representation of treatment of Diesel feed-1 with fresh adsorbent.

In this experiment commercially available alumina of balls of size ranging from about 3 to about 5 mm diameter were loaded in the top and bottom zone of the fixed bed reactor. The 60 gm of adsorbent A-1 was loaded in middle zone of the reactor. All other conditions remained unchanged as mentioned in example 1. The results obtained are shown in Table 3 and FIG. 3.

TABLE 3

Desulfurization of Diesel Feed-1 with Fresh Adsorbent A-1

| Cum. effluent wt. (gm) | Cum. effluent wt./ Adsorbent wt. (gm/gm) | Sulfur Content (ppm) |
| --- | --- | --- |
| 211 | 3.5 | 27 |
| 302 | 5.0 | 48 |
| 339 | 5.7 | 45 |
| 407 | 6.8 | 76 |
| 473 | 7.9 | 90 |
| 604 | 10.1 | 112 |
| 735 | 12.3 | 103 |
| 869 | 14.5 | 128 |
| 1264 | 21.1 | 135 |
| 1497 | 25.0 | 140 |
| 1618 | 27.0 | 125 |
| 1728 | 28.8 | 123 |
| 2231 | 37.2 | 129 |
| 2736 | 45.6 | 140 |
| 4000 | 66.7 | 148 |

Example 4

Treatment of Diesel Feed-2 with Regenerated (Regeneration-1) Adsorbent A-1

Figure 4:
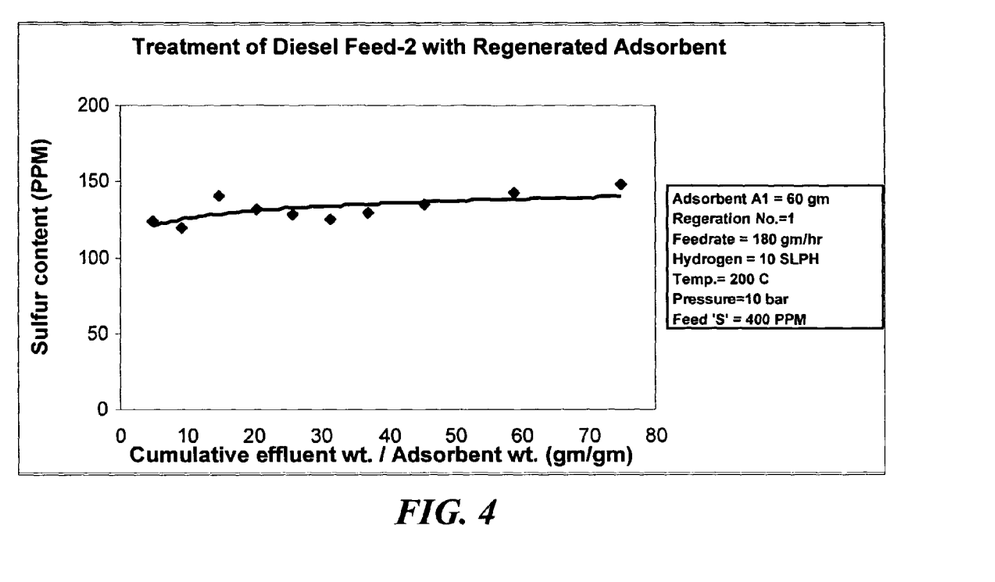
FIG. 4 is a graphical representation of treatment of Diesel feed-2 with regenerated adsorbent.

The adsorbent used in example-3 was regenerated (Regeneration-1) with nitrogen and/air mixture as per previously described method. The Feed was also changed to Feed-2, which contains 400 ppm sulfur. The adsorption was performed at lower operating temperature of 200° C. and higher feed rate of 180 gm/hr. The results obtained are shown in Table 4 and FIG. 4.

TABLE 4

Desulfurization of Diesel Feed-2 with Regenerated Adsorbent (Regeneration-1) A-1

| Cum. effluent wt. (gm) | Cum. effluent wt./ Adsorbent wt. (gm/gm) | Sulfur content (ppm) |
| --- | --- | --- |
| 290 | 4.8 | 124 |
| 546 | 9.1 | 119 |
| 885 | 14.8 | 140 |
| 1220 | 20.3 | 131 |
| 1556 | 25.9 | 128 |
| 1892 | 31.5 | 125 |
| 2231 | 37.2 | 129 |
| 2736 | 45.6 | 135 |
| 3550 | 59.2 | 142 |
| 4500 | 75.0 | 148 |

Example 5

Treatment of Diesel Feed-2 with Regenerated (Regeneration-2) Adsorbent A-1

Figure 5:
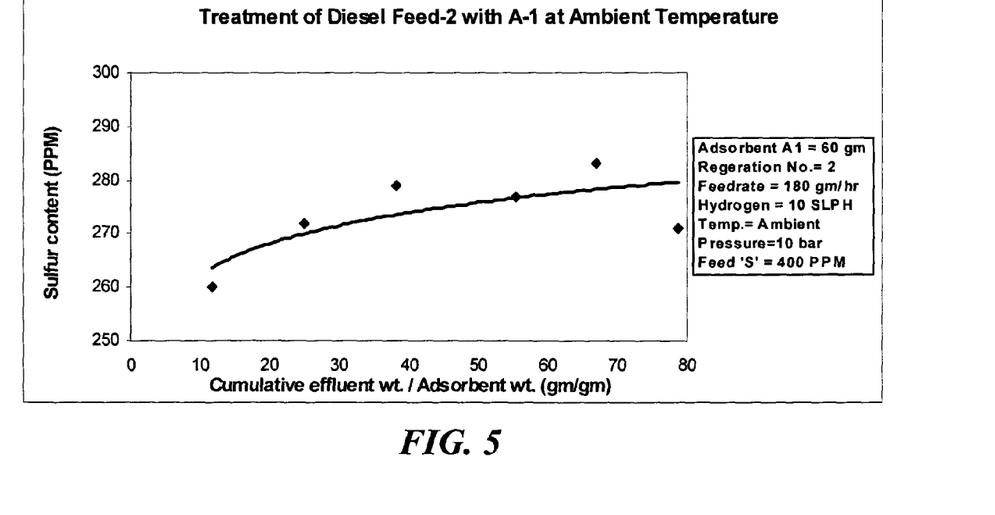
FIG. 5 is a graphical representation of treatment of Diesel feed-2 with A-1 at ambient temperature.

The adsorbent used in example 3 was further regenerated (Regeneration-2). The adsorption was performed with Feed-2 at ambient operating temperature of 30° C. and higher feed rate of 180 gm/hr. The results obtained are shown in Table 5 and FIG. 5.

TABLE 5

Desulfurization of Diesel Feed-2 with Regenerated (Regeneration-2) Adsorbent A-1

| Cum. effluent wt. (gm) | Cum. effluent wt./ Adsorbent wt. (gm/gm) | Sulfur Content (ppm) |
| --- | --- | --- |
| 700 | 11.7 | 260 |
| 1500 | 25.0 | 272 |
| 2284 | 38.1 | 279 |
| 3332 | 55.5 | 277 |
| 4024 | 67.1 | 283 |
| 4718 | 78.6 | 271 |

Example 6

Treatment of Diesel Feed-3 with Regenerated (Regeneration-3) Adsorbent A-1

Figure 6:
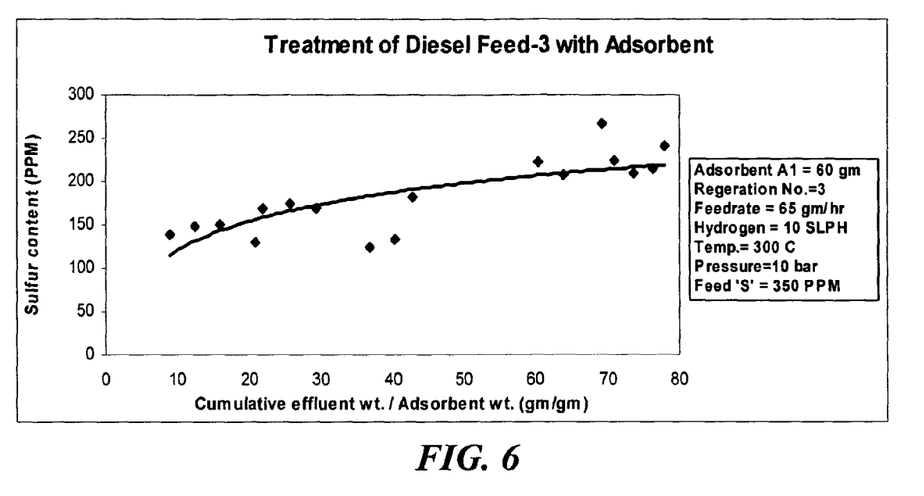
FIG. 6 is a graphical representation of treatment of Diesel feed-3 with adsorbent.

The adsorbent used in example 4 was further regenerated (Regeneration-3). The Feed was also changed to Feed-3 which contains 350 ppm sulfur i.e. lower than Feed-2. The adsorption was performed at 300° C. temperature at a feed rate of 65 gm/hr. The results obtained are shown in Table 6 and FIG. 6.

TABLE 6

Desulfurization of Diesel Feed-3 with Regenerated (Regeneration-3) Adsorbent A-1

| Cum. effluent wt. (gm) | Cum. effluent wt./ Adsorbent wt. (gm/gm) | Sulfur Content (ppm) |
|---|---|---|
| 533 | 8.9 | 138 |
| 744 | 12.4 | 148 |
| 955 | 15.9 | 150 |
| 1252 | 20.9 | 130 |
| 1310 | 21.8 | 169 |
| 1535 | 25.6 | 174 |
| 1764 | 29.4 | 168 |
| 2211 | 36.9 | 124 |
| 2415 | 40.3 | 134 |
| 2570 | 42.8 | 182 |
| 3623 | 60.4 | 222 |
| 3830 | 63.8 | 207 |
| 4149 | 69.2 | 267 |
| 4253 | 70.9 | 224 |
| 4417 | 73.6 | 210 |
| 4572 | 76.2 | 214 |
| 4677 | 78.0 | 241 |

Example 7

Treatment of Diesel Feed4 with Regenerated (Regeneration-4) Adsorbent A-1

Figure 7:
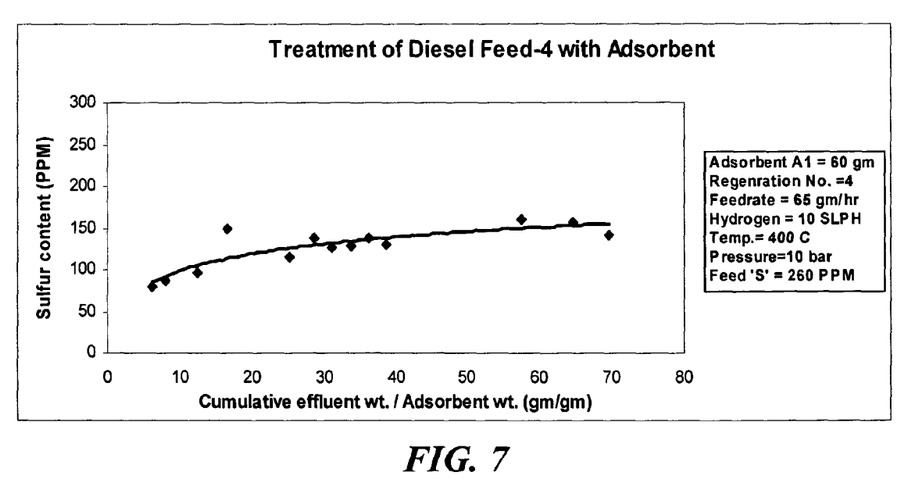
FIG. 7 is a graphical representation of treatment of Diesel feed-4 with adsorbent.

The adsorbent used in example 5 was further regenerated (Regeneration-4). The Feed was also changed to Feed-4 which contains 260 ppm sulfur i.e. lower than Feed-3. The adsorption was performed at 400° C. temperature at a feed rate of 65 gm/hr. The results obtained are shown in Table 7 and FIG. 7.

TABLE 7

Desulfurization of Diesel Feed-4 with Regenerated (Regeneration-4) Adsorbent A-1

| Cum. effluent wt. (gm) | Cum. effluent wt./ Adsorbent wt. (gm/gm) | Sulfur Content (ppm) |
|---|---|---|
| 367 | 6.1 | 80 |
| 476 | 7.9 | 86 |
| 744 | 12.4 | 96 |
| 998 | 16.6 | 150 |
| 1512 | 25.2 | 116 |
| 1715 | 28.6 | 137 |
| 1872 | 31.2 | 126 |
| 2020 | 33.7 | 129 |
| 2174 | 36.2 | 138 |
| 2326 | 38.8 | 131 |
| 3444 | 57.4 | 161 |
| 3883 | 64.7 | 157 |
| 4169 | 69.5 | 142 |

Example 8

Treatment of Diesel Feed-5 with Adsorbent A-2

Figure 8:
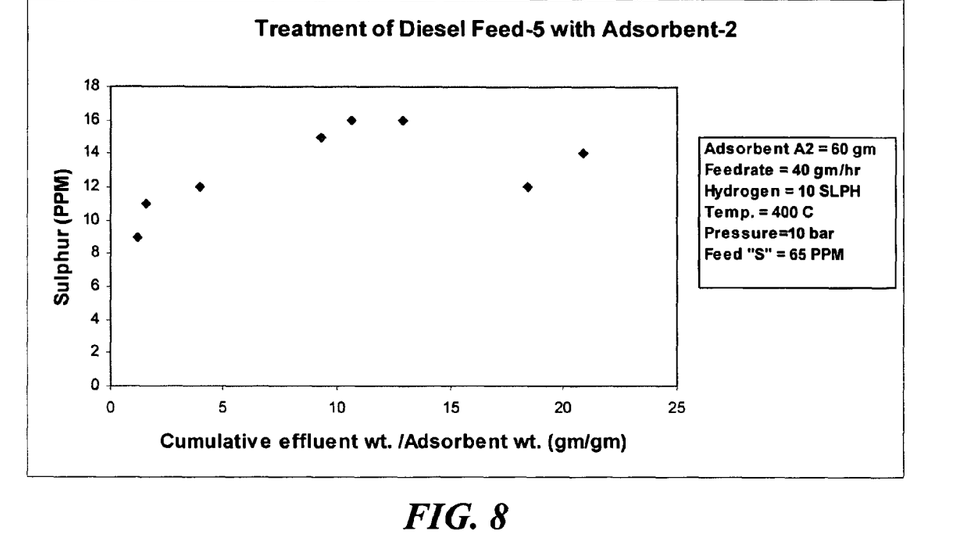
FIG. 8 is a graphical representation of treatment of Diesel feed-5 with adsorbent 2.

The adsorbent A-2 was prepared by changing the proportions of various constituents. The adsorbent A-2 comprised more surface area and pore volume in comparison to adsorbent A-1. The Feed-5, which contains 65 ppm sulfur, was used for this experiment. The adsorption was performed at 400° C. temperature at a feed rate of 40 gm/hr. The results obtained are shown in Table-8 and FIG. 8.

TABLE 8

Desulfurization of Diesel Feed-5 with Adsorbent A-2

| Cum. Effluent wt. (gm) | Cum. effluent wt./ Adsorbent wt. (gm/gm) | Sulfur content (ppm) |
|---|---|---|
| 181 | 1.2 | 9 |
| 238 | 1.6 | 11 |
| 594 | 4.0 | 12 |
| 1394 | 9.3 | 15 |
| 1587 | 10.6 | 16 |
| 1933 | 12.9 | 16 |
| 2762 | 18.4 | 12 |
| 3132 | 20.9 | 14 |

Example 9

Treatment of Diesel Feed-3 with Regenerated (Regeneration-1) Adsorbent A-2

Figure 9:
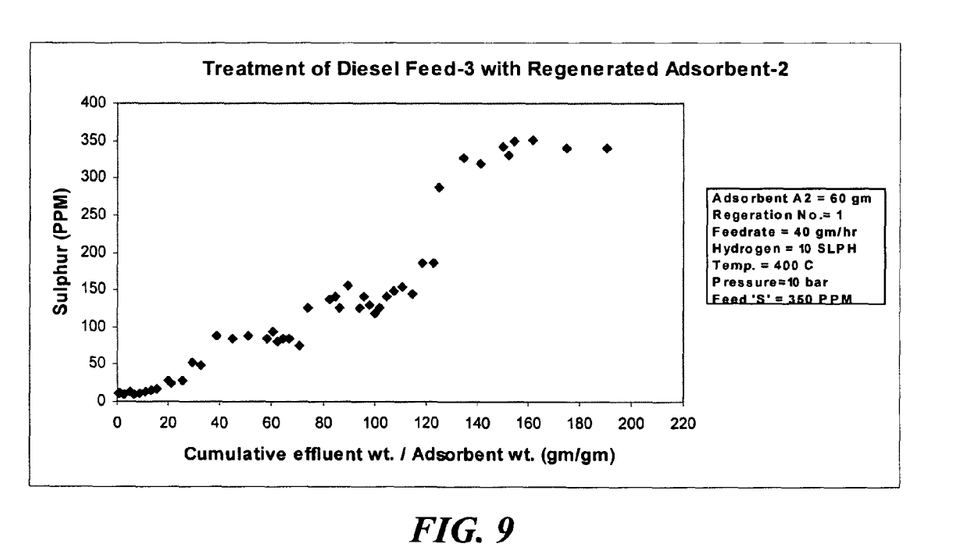
FIG. 9 is a graphical representation of treatment of Diesel feed-3 with regenerated adsorbent 2.
Figure 10:
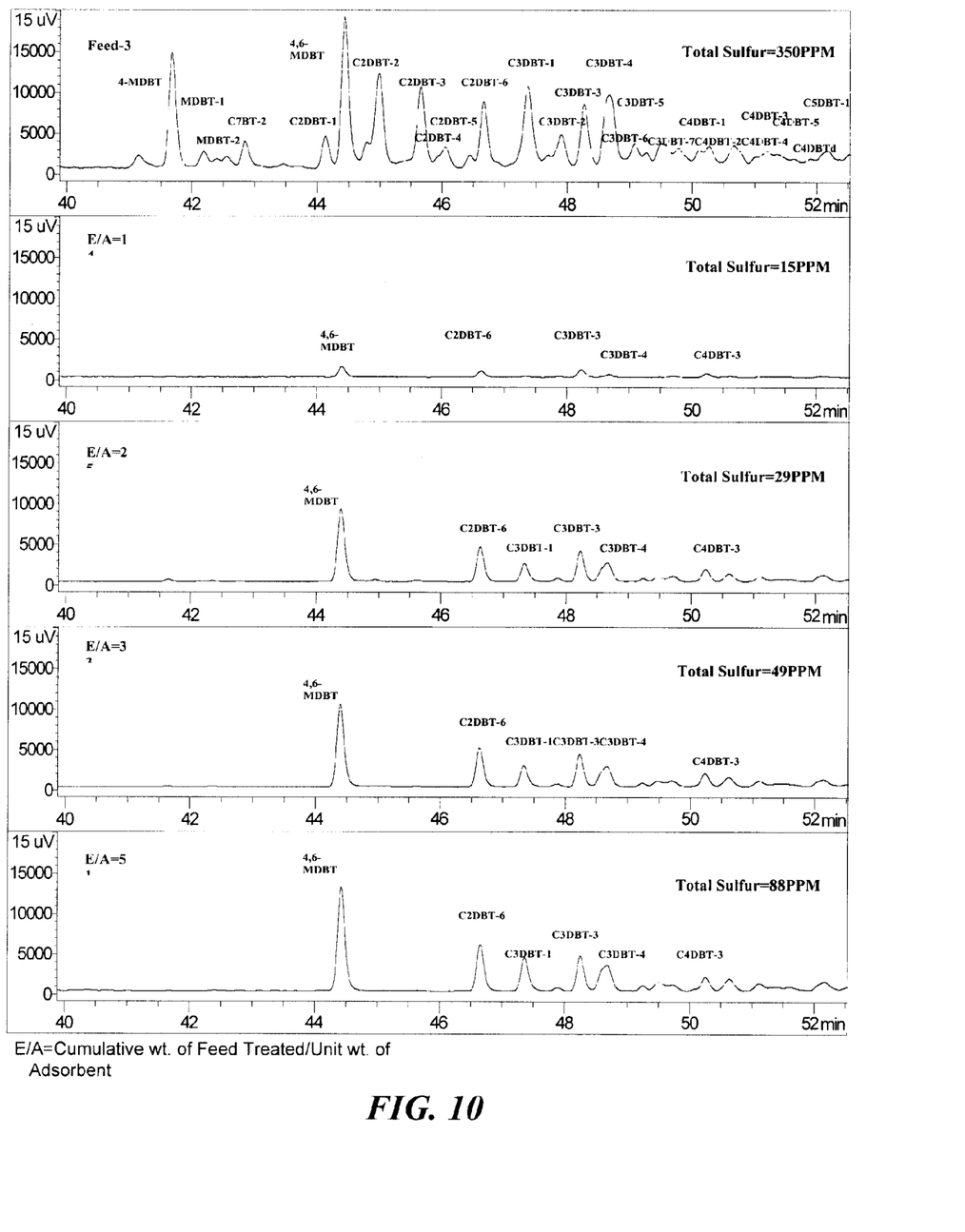
FIG. 10 is a graphical representation of GC-SCD chromatogram of feed and products.
Figure 11:
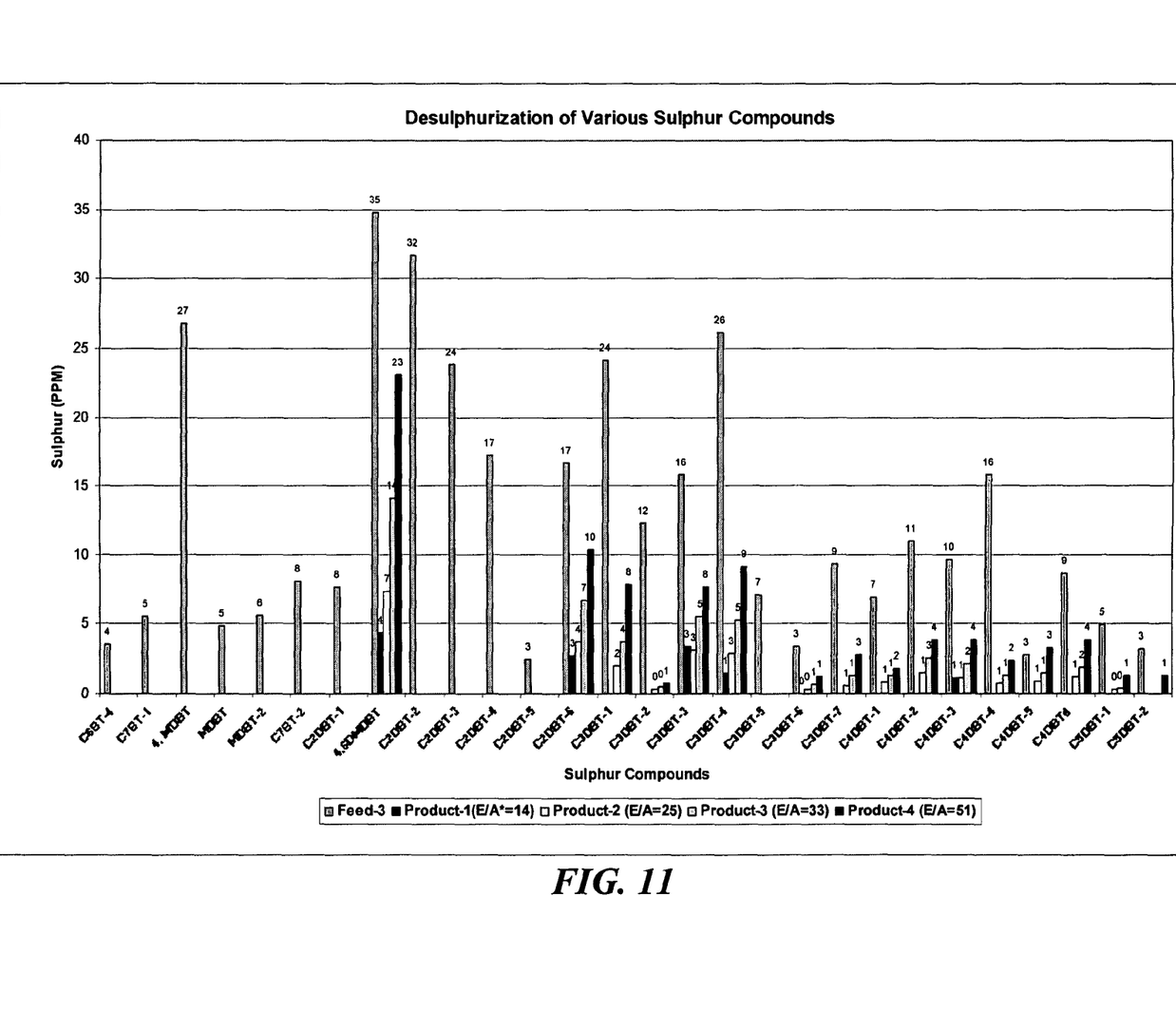
FIG. 11 is a graphical representation of desulphurization of various sulphur compounds.
Figure 12:
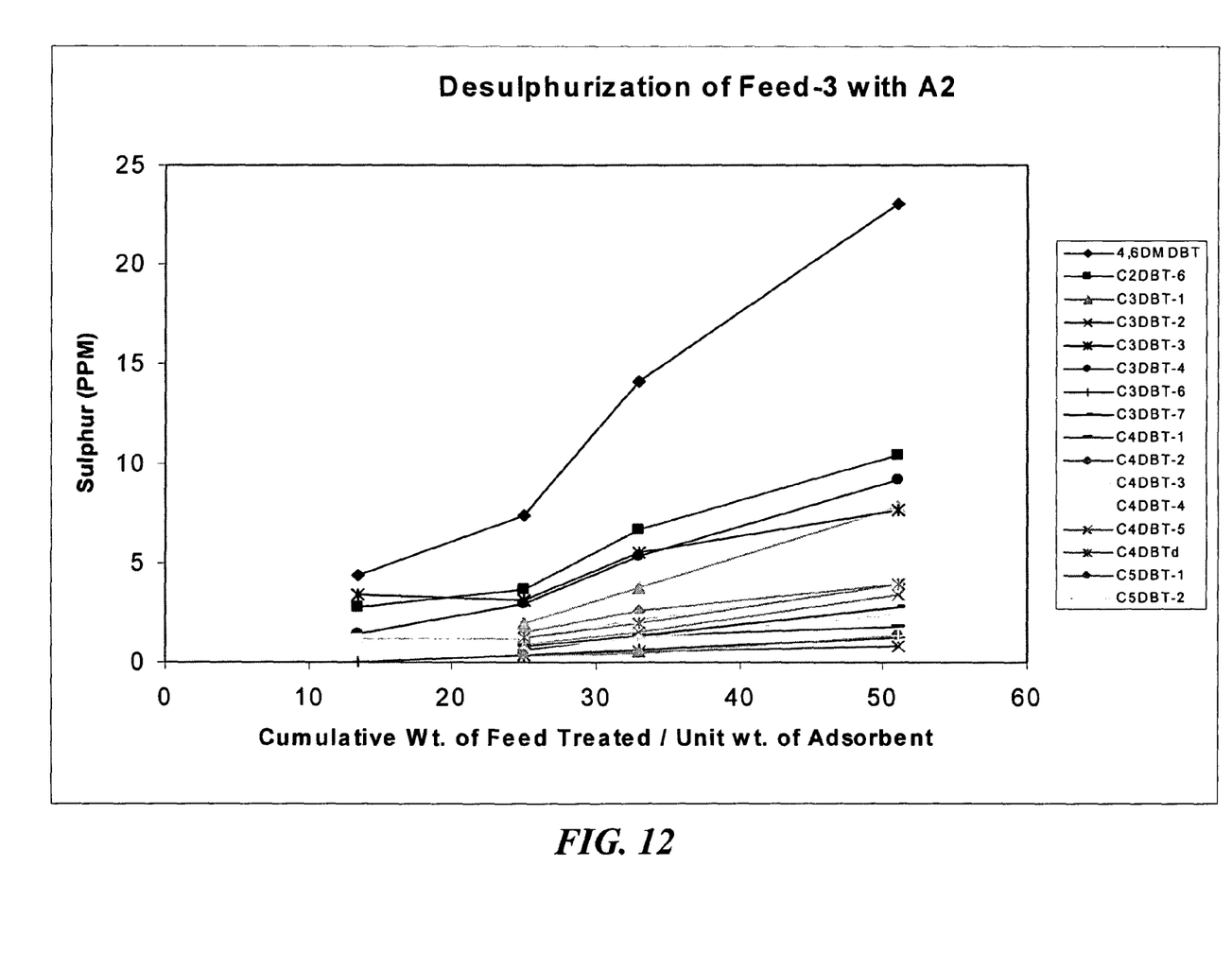
FIG. 12 is a graphical representation of treatment of feed-3 with A 2.
Figure 13:
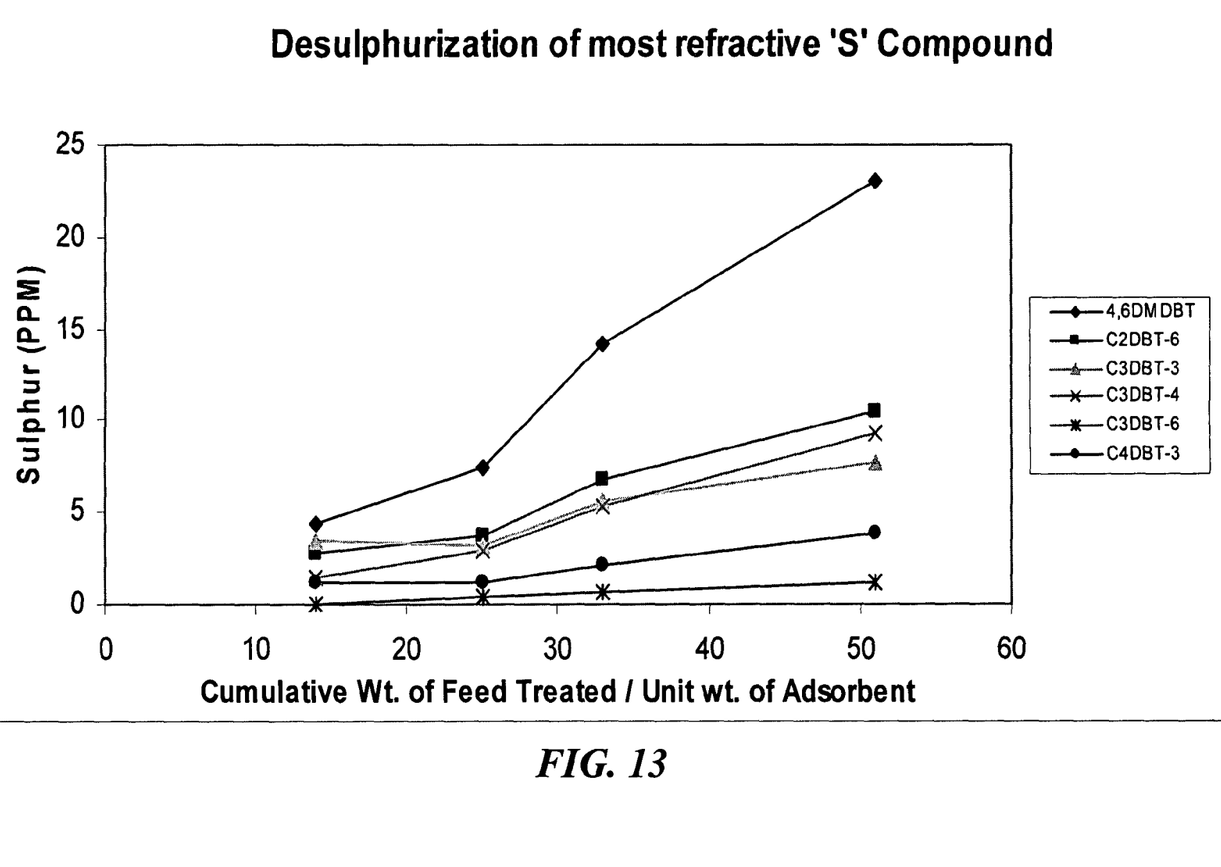
FIG. 13 is a graphical representation of desulphurization of most refractive 'S' compound.

The adsorbent A-2 used in previous experiment was regenerated. The Feed-3, which contains 350-ppm sulfur, was used for this experiment. The detailed data of GC-SCD of this feed is reported in Table 1b. The adsorption was performed at 400° C. temperature and feed rate of 40 gm/hr. The results obtained are shown in Table 9 and FIG. 9. The detailed GS-SCD was performed for Feed-3 (Table 1b) and various product samples collected at regular intervals (Table 10a to Table 10d). To identify the various sulfur compounds, GC-SCD of standard sulfur compounds (BT, DBT, 4-MDBT and 4,6-DMDBT) was performed and other sulphur compounds were detected by referring to the relative retention times available in literature reported by Ma et. al. (1994, 1998). The GC-SCD chromatograms of Feed-3 and product samples are shown in FIG. 10. It is observed from the results shown in Tables 10a-10d7&11 and FIG. 11 to FIG. 13 that 4,6 DMDBT; C2DBT-6; C3DBT-3; C3 DBT-4 & C4 DBT-3 are most refractive sulphur compounds. Selectively of desulfurization of various sulphur compounds are shown in FIG. 12. Selectivity of desulfurization of most refractive sulphur compounds are shown in FIG. 13.

TABLE 9

Desulfurization of Diesel Feed-3 with Regenerated Adsorbent A-2

| Cum. effluent wt. gm | Cum. effluent wt./ Adsorbent wt. gm/gm | Sulfur Content ppm |
|---|---|---|
| 80 | 0.5 | 12 |
| 199 | 1.3 | 12 |
| 442 | 2.9 | 9 |
| 754 | 5.0 | 14 |
| 971 | 6.5 | 10 |
| 1344 | 9.0 | 12 |
| 1681 | 11.2 | 14 |
| 2028 | 13.5 | 15 |
| 2353 | 15.7 | 16 |
| 3019 | 20.1 | 29 |
| 3172 | 21.1 | 25 |
| 3809 | 25.4 | 29 |
| 4451 | 29.7 | 53 |
| 4894 | 32.6 | 49 |
| 5832 | 38.9 | 88 |
| 6770 | 45.1 | 84 |
| 7704 | 51.4 | 88 |
| 8756 | 58.4 | 84 |
| 9060 | 60.4 | 94 |
| 9337 | 62.2 | 81 |
| 9692 | 64.6 | 84 |

TABLE 9-continued

Desulfurization of Diesel Feed-3 with Regenerated Adsorbent A-2

| Cum. effluent wt. gm | Cum. effluent wt./ Adsorbent wt. gm/gm | Sulfur Content ppm |
|---|---|---|
| 9995 | 66.6 | 84 |
| 10602 | 70.7 | 76 |
| 11110 | 74.1 | 125 |
| 12333 | 82.2 | 138 |
| 12638 | 84.3 | 140 |
| 12943 | 86.3 | 126 |
| 13425 | 89.5 | 155 |
| 14043 | 93.6 | 126 |
| 14356 | 95.7 | 141 |
| 14650 | 97.7 | 129 |
| 15020 | 100.1 | 118 |
| 15284 | 101.9 | 125 |
| 15641 | 104.3 | 140 |
| 16120 | 107.5 | 148 |
| 16610 | 110.7 | 154 |
| 17132 | 114.2 | 145 |
| 17784 | 118.6 | 185 |
| 18442 | 122.9 | 186 |
| 18782 | 125.2 | 288 |
| 20165 | 134.4 | 326 |
| 21142 | 140.9 | 319 |
| 22540 | 150.3 | 341 |
| 22864 | 152.4 | 331 |
| 23195 | 154.6 | 349 |
| 24211 | 161.4 | 352 |
| 26226 | 174.8 | 339 |
| 28597 | 190.6 | 339 |

TABLE 10a

GC-SCD of Treated Diesel Product (Total 'S' = 15 ppm)
Product-1 (Cum. effluent wt./Adsorbent wt. = 14)

| Peak No. | Comp | RT Min | Area | Area % | Total 'S' PPM |
|---|---|---|---|---|---|
| 1 | 4,6-DMDBT | 44.40 | 10693 | 29.06 | 4 |
| 2 | C2DBT-6 | 46.63 | 6733 | 18.30 | 3 |
| 3 | C3DBT-3 | 48.23 | 8385 | 22.78 | 3 |
| 4 | C3DBT-4 | 48.68 | 3596 | 9.77 | 1 |
| 5 | C3DBT-6 | 50.24 | 4469 | 12.14 | 2 |
| 6 | C4DBT-3 | 52.09 | 2924 | 7.95 | 1 |
| | | | 36799 | 100.00 | 15 |

TABLE 10b

GC-SCD of Treated Diesel Product (Total 'S' = 29 ppm)
Product-2 (Cum. effluent wt./Adsorbent wt. = 25)

| Peak No. | Comp | RT Min | Area | Area % | Total S PPM |
|---|---|---|---|---|---|
| 1 | 4,6-DMDBT | 44.40 | 75475 | 25.45 | 7 |
| 2 | C2DBT-3 | 45.62 | 3383 | 1.14 | 0 |
| 3 | C2DBT-6 | 46.63 | 37575 | 12.67 | 4 |
| 4 | C3DBT-1 | 47.34 | 20037 | 6.76 | 2 |
| 5 | C3DBT-2 | 47.87 | 3492 | 1.18 | 0 |
| 6 | C3DBT-3 | 48.23 | 32048 | 10.81 | 3 |
| 7 | C3DBT-4 | 48.66 | 29891 | 10.08 | 3 |
| 8 | C3DBT-5 | 49.23 | 3715 | 1.25 | 0 |
| 9 | C3DBT-6 | 49.47 | 6302 | 2.13 | 1 |
| 10 | C3DBT-7 | 49.71 | 8051 | 2.71 | 1 |
| 11 | C4DBT-1 | 50.24 | 15271 | 5.15 | 1 |
| 12 | C4DBT-2 | 50.61 | 11503 | 3.88 | 1 |
| 13 | C4DBT-3 | 51.11 | 7572 | 2.55 | 1 |
| 14 | C4DBT-4 | 51.57 | 8983 | 3.03 | 1 |
| 15 | C4DBT-5 | 52.13 | 12719 | 4.29 | 1 |
| 16 | C4DBT$^d$ | 52.51 | 3589 | 1.21 | 0 |
| | | | 296541 | 100.00 | 29 |

TABLE 10c

GC-SCD of Treated Diesel Product (Total 'S' = 49 ppm)
Product-3 (Cum. effluent wt./Adsorbent wt. = 33)

| Peak No. | Comp | RT Min | Area | Area % | Total S PPM |
|---|---|---|---|---|---|
| 1 | 4,6-DMDBT | 44.39 | 88149 | 28.85 | 14 |
| 2 | C2DBT-6 | 46.63 | 41834 | 13.69 | 7 |
| 3 | C3DBT-1 | 47.34 | 23324 | 7.63 | 4 |
| 4 | C3DBT-2 | 47.86 | 3080 | 1.01 | 0 |
| 5 | C3DBT-3 | 48.23 | 34255 | 11.21 | 5 |
| 6 | C3DBT-4 | 48.67 | 33093 | 10.83 | 5 |
| 7 | C3DBT-6 | 49.23 | 3975 | 1.30 | 1 |
| 8 | C3DBT-7 | 49.48 | 8321 | 2.72 | 1 |
| 9 | C4DBT-1 | 49.70 | 8380 | 2.74 | 1 |
| 10 | C4DBT-2 | 50.23 | 16124 | 5.28 | 3 |
| 11 | C4DBT-3 | 50.62 | 13297 | 4.35 | 2 |
| 12 | C4DBT-4 | 51.10 | 7985 | 2.61 | 1 |
| 13 | C4DBT-5 | 51.39 | 9176 | 3.00 | 1 |
| 14 | C4DBT$^d$ | 52.13 | 11941 | 3.91 | 2 |
| 15 | C5DBT-1 | 52.52 | 2594 | 0.85 | 0 |
| | | | 305528 | 100.00 | 49 |

TABLE 10d

GC-SCD of Treated Diesel Product (Total 'S' = 88 ppm)
Product-4 (Cum. effluent wt./Adsorbent wt. = 51)

| Peak No. | Comp | RT Min | Area | Area % | Total S PPM |
|---|---|---|---|---|---|
| 1 | 4,6-DMDBT | 44.42 | 111799 | 26.22 | 23 |
| 2 | C2DBT-6 | 46.65 | 50381 | 11.82 | 10 |
| 3 | C3DBT-1 | 47.36 | 37896 | 8.89 | 8 |
| 4 | C3DBT-2 | 47.89 | 3740 | 0.88 | 1 |
| 5 | C3DBT-3 | 48.25 | 37066 | 8.69 | 8 |
| 6 | C3DBT-4 | 48.68 | 44545 | 10.45 | 9 |
| 7 | C3DBT-6 | 49.25 | 5834 | 1.37 | 1 |
| 8 | C3DBT-7 | 49.50 | 13408 | 3.15 | 3 |
| 9 | C4DBT-1 | 49.73 | 8712 | 2.04 | 2 |
| 10 | C4DBT-2 | 50.26 | 18765 | 4.40 | 4 |
| 11 | C4DBT-3 | 50.64 | 18712 | 4.39 | 4 |
| 12 | C4DBT-4 | 51.12 | 11750 | 2.76 | 2 |
| 13 | C4DBT-5 | 51.38 | 16171 | 3.79 | 3 |
| 14 | C4DBT$^d$ | 52.16 | 18816 | 4.41 | 4 |
| 15 | C5DBT-1 | 52.54 | 6587 | 1.55 | 1 |
| 16 | C5DBT-2 | 52.83 | 6506 | 1.53 | 1 |
| | | | 426310 | 100 | 88 |

TABLE 11

Adsorption Selectivity of Various 'S' Compounds

| | | Sulphur Content (ppm) | | | | |
|---|---|---|---|---|---|---|
| RT Min. | Compd. | Feed-1 | Product-1 | Product-2 | Product-3 | Product-4 |
| 38.73 | C6BT-4 | 4 | | | | |
| 41.15 | C7BT-1 | 5 | | | | |
| 41.68 | 4, MDBT | 27 | | | | |

TABLE 11-continued

Adsorption Selectivity of Various 'S' Compounds

| RT Min. | Compd. | Sulphur Content (ppm) | | | | |
|---|---|---|---|---|---|---|
| | | Feed-1 | Product-1 | Product-2 | Product-3 | Product-4 |
| 42.19 | MDBT | 5 | | | | |
| 42.55 | MDBT-2 | 6 | | | | |
| 42.85 | C7BT-2 | 8 | | | | |
| 44.13 | C2DBT-1 | 8 | | | | |
| 44.44 | 4,6DMDBT | 35 | 4 | 7 | 14 | 23 |
| 44.99 | C2DBT-2 | 32 | | | | |
| 45.66 | C2DBT-3 | 24 | | | | |
| 46.05 | C2DBT-4 | 17 | | | | |
| 46.44 | C2DBT-5 | 3 | | | | |
| 46.67 | C2DBT-6 | 17 | 3 | 4 | 7 | 10 |
| 47.37 | C3DBT-1 | 24 | | 2 | 4 | 8 |
| 47.90 | C3DBT-2 | 12 | | 0 | 0 | 1 |
| 48.27 | C3DBT-3 | 16 | 3 | 3 | 5 | 8 |
| 48.67 | C3DBT-4 | 26 | 1 | 3 | 5 | 9 |
| 49.08 | C3DBT-5 | 7 | | | | |
| 49.26 | C3DBT-6 | 3 | 0 | 0 | 1 | 1 |
| 49.52 | C3DBT-7 | 9 | | 1 | 1 | 3 |
| 49.78 | C4DBT-1 | 7 | | 1 | 1 | 2 |
| 50.27 | C4DBT-2 | 11 | | 1 | 3 | 4 |
| 50.67 | C4DBT-3 | 10 | 1 | 1 | 2 | 4 |
| 51.20 | C4DBT-4 | 16 | | 1 | 1 | 2 |
| 51.90 | C4DBT-5 | 3 | | 1 | 1 | 3 |
| 52.17 | C4DBT$^d$ | 9 | | 1 | 2 | 4 |
| 52.52 | C5DBT-1 | 5 | | 0 | 0 | 1 |
| 52.83 | C5DBT-2 | 3 | | | | 1 |

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. An adsorbent composition for removal of refractory sulphur compounds from a refinery stream comprising:

| | Ingredient | w/w (%) |
|---|---|---|
| a) | a base clay component | about 10.0 to about 50.0; |
| b) | zinc nickel aluminate | about 45.0 to about 50.0; |
| c) | zinc nickel oxide | about 25.0 to about 40.0. |
| d) | alumina | about 0 to about 10.0, wherein the absorbent compostion is devoid of free zinc oxide. |

2. The composition of claim 1, wherein the base clay component further comprises alumina, magnesia, titania or combinations thereof.

3. The composition of claim 1, wherein the base clay component comprises titanium oxide, ferric oxide, manganese dioxide, and silicon dioxide.

4. The composition of claim 1 wherein the composition has a surface area ranging from about 50 to about 200 m2/gm.

5. The composition of claim 1 wherein the composition has a pore volume ranging from about 0.1 to about 0.6 cc/gm.

6. The composition of claim 1 wherein the composition has an average pore size ranging from about 50 to about 200 Å.

7. The composition of claim 1 wherein the refinery stream includes at least one of heavy end gas oil, gasoline, naptha, kerosene, jet fuel and diesel fraction.

8. A process for preparation of an adsorbent composition for removal of refractory sulphur compounds from a refinery stream, the said process comprising:
   a) mixing a base clay component in the range of about 10.0% to about 50.0% (w/w), a metal oxide component in the range of about 20.0% to about 60.0% (w/w), and an adsorption enhancer component in the range of about 10.0% to about 40.0% (w/w), wherein the adsorption enhancer component is a bimetallic alloy of metals selected from the group consisting of nickel, platinum, palladium, titanium and zinc;
   b) grinding the above to fine particles;
   c) homogenizing by milling with a solvent to form a wet solid;
   d) peptizing the wet solid with dilute mineral acid;
   e) extruding the peptized material;
   f) drying the extrudates at a temperature of about 100-about 200° C. for about 4 to about 12 hours;
   g) calcining the dried material at a temperature ranging from about 200-about 550° C. for a period of about 4 to about 12 hours;
   h) reducing the calcined material under hydrogen flow at a temperature ranging between about 250-about 500° C.; and
   i) obtaining dried adsorbent composition devoid of free zinc oxide.

9. The process of claim 8 wherein the solvent is selected from the group consisting of water, acetone and propanol.

10. The process of claim 8, wherein the dilute mineral acid is dilute nitric acid.

11. The process of claim 8 further comprising applying an extrusion-aiding agent selected from a group consisting of polyvinyl alcohols, polyethylene glycols and carboxymethyl cellulose.

* * * * *